Jan. 29, 1929.
P. HOPF
1,700,634
GRINDING TOOL
Filed Dec. 27, 1924
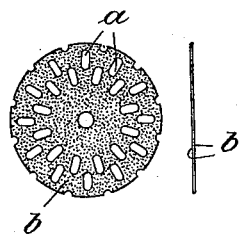
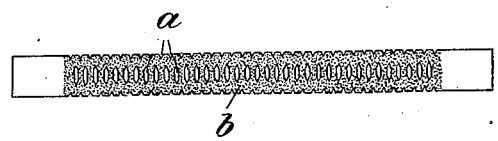
Inventor:
Paul Hopf,
per Hans & Danielsson
Attorneys.

Patented Jan. 29, 1929.

1,700,634

UNITED STATES PATENT OFFICE.

PAUL HOPF, OF BERLIN, GERMANY.

GRINDING TOOL.

Application filed December 27, 1924, Serial No. 758,458, and in Germany November 13, 1924.

The object of the present invention is to produce a tool whereby grinding and cutting can be effected at the same time, and the invention consists in the provision of a thin slotted metal plate having a notched edge and being covered with abrasive powder.

Fig. 1 of the accompanying drawings represents a side and an edge view of a circular grinding and cutting plate made according to the invention, and Fig. 2 shows the tool in the form of a band.

The tool $b$ is made of thin sheet metal, preferably steel, and may either have the form of a disc, as shown in Fig. 1, or of a band, as shown in Fig. 2. The tool is covered with abrasive powder and provided with a plurality of symmetrically placed slots and notches $a$ forming cutting edges whereby the effect of the tool is considerably enhanced. The notches at the edges of the tool enable the latter to act as a saw while at the same time a grinding effect is produced by the slotted faces.

I claim:

A dental grinding and cutting tool comprising a thin slotted steel plate covered with abrasive powder and formed with notched edges so as to have at the same time a grinding and a sawing action.

PAUL HOPF.